United States Patent
Papakonstantopoulos et al.

(10) Patent No.: US 11,851,553 B2
(45) Date of Patent: Dec. 26, 2023

(54) RUBBER COMPOSITION FOR STIFFNESS

(71) Applicant: The Goodyear Tire & Rubber Company, Akron, OH (US)

(72) Inventors: George Jim Papakonstantopoulos, Medina, OH (US); Bruce Raymond Hahn, Hudson, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 91 days.

(21) Appl. No.: 17/656,012

(22) Filed: Mar. 23, 2022

(65) Prior Publication Data
US 2023/0303814 A1 Sep. 28, 2023

(51) Int. Cl.
*C08L 23/16* (2006.01)
*B60C 1/00* (2006.01)
*C08L 9/06* (2006.01)

(52) U.S. Cl.
CPC ............ *C08L 23/16* (2013.01); *B60C 1/0016* (2013.01); *B60C 1/0025* (2013.01); *C08L 9/06* (2013.01); *C08L 2203/18* (2013.01)

(58) Field of Classification Search
CPC .............. C08L 23/16; C08L 9/06; B60C 1/00
USPC ........................................... 523/156
See application file for complete search history.

(56) References Cited

U.S. PATENT DOCUMENTS

| | | |
|---|---|---|
| 4,474,908 A | 10/1984 | Wagner |
| 6,573,324 B1 | 6/2003 | Cohen et al. |
| 6,606,852 B1 | 8/2003 | Harvey et al. |
| 2011/0054101 A1* | 3/2011 | Zhao ................ C08L 21/00 524/451 |
| 2016/0185098 A1 | 6/2016 | Sato et al. |
| 2020/0002109 A1 | 1/2020 | Hamakubo et al. |

FOREIGN PATENT DOCUMENTS

| | | | |
|---|---|---|---|
| EP | 0232463 | * 10/1986 | |
| EP | 1459907 A1 | * 9/2004 | ........... B60C 1/0016 |

OTHER PUBLICATIONS

Data Sheet for Escorez 1102 (Year: 2020).*
Extended European Search Report for Application No. 23162933.8, dated Aug. 14, 2023.

* cited by examiner

*Primary Examiner* — Deve V Hall
(74) *Attorney, Agent, or Firm* — Mandy B. Willis

(57) ABSTRACT

A rubber composition for incorporation in an engineered article comprises, based on 100 parts by weight (phr) ethylene-propylene-diene copolymer (EPDM) elastomer, from about 5 phr to about 100 phr reinforcing filler preferably comprising a prehydrophobated precipitated silica. In the contemplated embodiment, the EPDM has a diene content that is greater than five percent (5%). The diene also contains branching.

18 Claims, No Drawings

RUBBER COMPOSITION FOR STIFFNESS

FIELD OF THE INVENTION

The present disclosure is directed to a rubber composition comprising an EDPM rubber grade with a high diene level. It is intended for use in engineered products and tires, and it be described particularly with reference thereto. However, it is appreciated that the present exemplary embodiments are also amenable to other like applications.

BACKGROUND OF THE INVENTION

Fillers are incorporated into natural and synthetic rubbers to improve the physical properties of the rubber vulcanizate. Principal among them is carbon black and silica. When used as a sole reinforcing filler, silica does not provide the overall improved performance of carbon black. Therefore, various silane coupling agents have been introduced for use with silica. Additionally, U.S. Pat. No. 4,474,908 introduced a prehydrophobated silica, which can replace the combination of silica and coupling agent.

In conventional compounds (e.g., containing conjugated diene-based elastomers), there is an observed deterioration of stiffness properties when a prehydrophobated silica is employed. Using a tire as an illustrative example, stiffness is desired in tread compounds for handling performance. Although a tire grows stiffer with aging, the desire is for the tread to maintain its original stiffness throughout the life of the tire.

Ethylene-propylene-diene copolymer (EPDM) is characterized by a low unsaturation content, which makes it desirable for use in rubber compositions designed to resist aging. However, this low unsaturation makes reinforcement of an EPDM-based rubber composition more difficult. It tends to restrict EPDM's ability to bond with a silica reinforcement (via a coupling agent), which relies on the availability of carbon-to-carbon double bonds in a rubber polymer. The low unsaturation also presents challenges with processability Furthermore, carbon black reinforcement of an EPDM-based rubber is also challenging to the extent that carbon black is more compatible with a conjugated diene-based elastomer. The select grade of carbon black and/or combination of filler(s) can be used to improve one of stiffness and hysteresis, but this is often to the detriment of the other.

There is a desire to increase stiffness while maintaining hysteresis. To overcome these challenges, a higher diene content EDPM is explored for use with a prehydrophobated silica reinforcement in rubber compositions. It is believed that such EDPM, characterized by a higher unsaturation content, would more readily interact with the prehydrophobated silica, affording the compound a higher stiffness which in turn would even allow for a reduction of the filler level needed to balance performance in such rubber compositions and would not demand a tradeoff between the desired properties.

SUMMARY OF THE INVENTION

One embodiment of the disclosure is directed to a rubber composition for incorporation in an engineered article. The composition comprises, based on 100 parts by weight (phr) elastomer, at least ethylene-propylene-diene copolymer (EPDM) and from about 5 phr to about 100 phr reinforcing filler comprising a prehydrophobated precipitated silica. In the contemplated embodiment, the EPDM has a diene content that is greater than five percent (5%). The reinforcing filler may optionally comprise an additional filler material selected from at least one of carbon black and silica. The rubber composition may optionally comprise a coupling agent for the additional silica.

Another embodiment of the disclosure is directed to a rubber composition, which comprises, based on 100 parts by weight (phr) elastomer, at least EDPM and from about 5 to about 100 phr of reinforcing filler. The EPDM is characterized by (a) a diene content that is greater than 5% and contains branching, (b) a Mooney Viscosity greater than 80 MU, and (c) an ethylene content less than 60%.

In one embodiment, the rubber composition is incorporated into a tire component, such as a tread cap, a sidewall layer, or a base layer arranged below the tread cap.

In other embodiments, the rubber composition is incorporated in an engineered product, such as a hose, hose cover, window gasket, weatherstrip, seal, belt, shoe sole, or roofing material (e.g., shingle).

DETAILED DESCRIPTION OF THE INVENTION

As used herein, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art.

As used herein, except where context requires otherwise, the term "comprise" and variations of the term, such as "comprising", "comprises" and "comprised", are not intended to exclude further additives, components, integers, or steps.

There is disclosed herein a rubber composition for use in an engineered article. The rubber composition comprises, based on 100 parts by weight (phr) elastomer, at least ethylene-propylene-diene copolymer (EPDM) characterized by a high diene content.

Ethylene-Propylene-Diene Terpolymer:

A critical aspect of the disclosure is the use of EPDM. In one embodiment, the disclosed composition comprises a majority portion of EPDM. Embodiments are contemplated in which the composition comprises 100 phr EPDM excluding other rubber elastomers, such as a conjugated diene-based elastomer, in a blend. However, other embodiments are contemplated in which the composition comprises greater than about 50 phr and, more preferably, greater than about 65 phr and, most preferably, greater than about 80 phr EPDM.

In certain embodiments, the disclosed composition comprises a minority portion of EPDM and includes at least one other rubber elastomer in a blend with the EPDM. Embodiments are contemplated in which the composition comprises less than about 49 phr and, more preferably, less than about 40 phr and, most preferably, less than about 30 phr EPDM. Embodiments are contemplated in which the composition comprises greater than about 10 phr and, more preferably, greater than about 20 phr and, most preferably, greater than about 30 phr EPDM.

In practice, the disclosed composition comprises between about 20 phr EPDM and 100 phr EPDM.

Example EPDMs that are available for use in the present disclosure are commercially available under the trademark VISTALON™ from ExxonMobil Chemical Company) and are described in U.S. Pat. No. 9,382,412. In practice, a suitable EPDM polymer may be commercially available from ExxonMobil under the Vistalon trademark under the designations 8600, 7602, or 7500. Vistalon™ 8600 is a branched ethylene/propylene/ENB terpolymer (EPDM) having a bimodal MWD, a Mooney viscosity of 81 (1+8 at 125° C.), an ethylene content of 58%, and ENB of 8.9 wt %, available from ExxonMobil Chemical Company. Vistalon™ 7602 is a branched ethylene/propylene/ENB terpolymer (EPDM) having a bimodal MWD, a Mooney viscosity between 60 and 70 (1+4 at 125° C.), an ethylene content of 55%, and ENB of 7.5 wt %, available from ExxonMobil Chemical Company. Vistalon™ 7500 is a branched ethylene/propylene/ENB terpolymer (EPDM) having a bimodal MWD, a Mooney viscosity of 82 (1+8 at 125° C.), an ethylene content of 56%, and ENB of 5.7 wt %, available from ExxonMobil Chemical Company.

In one embodiment, the EPDM has a Mooney viscosity, as determined according to ASTM D1646, of (ML [1+8] 125° C.) of from about 25 to about 150 and, more preferably, a Mooney viscosity greater than 60 and, most preferably, a Mooney viscosity greater than 80.

In one embodiment, the EPDM may have an ethylene content, as determined by ASTM D3900A, of from about 50 to about 60 wt % of the EPDM.

The amount of the diene-derived (or "diene") in the EPDM may vary from about 0.3 to about 15 wt % and, more preferably from at least 5 wt % or greater. Suitable dienes include, for example, 1,4-hexadiene, 1,6-octadiene, 5-methyl-1,4-hexadiene, 3,7-dimethyl-1,6 octadiene, dicyclopentadiene (DCPD), ethylidene norbornene (ENB), norbornadiene, 5-vinyl-2-norbornene (VNB), and combinations thereof. A preferred diene is ENB.

In one embodiment, the EPDM has functional chemistries capable of reacting with themselves or with a reinforcing filler.

Conjugated Diene-Based Elastomers

The rubber composition may optionally include at least a second elastomer in a blend with the EPDM. In one embodiment, the second elastomer is a conjugated diene-based elastomer. Certain embodiments are contemplated in which the one or more additional elastomer(s) comprise a minority portion of the composition. By minority portion, the composition may comprise less than 49 phr of the second elastomer and, more preferably, less than 20 phr total of additional elastomers. Certain embodiments are contemplated in which the one or more additional elastomer(s) comprise a majority portion of the composition. By majority portion, the composition may comprise greater than 51 phr of additional elastomer(s) other than the EPDM.

Various rubber materials may be used such as, for example, polymers and copolymers of at least one of isoprene and 1,3-butadiene and of styrene copolymerized with at least one of isoprene and 1,3-butadiene, and mixtures thereof.

Representative of such conjugated diene-based elastomers are, for example, comprised of at least one of cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers.

The cis 1,4-polyisoprene and cis 1,4-polyisoprene natural rubber are well known to those having skill in the rubber art.

Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers.

Specific examples of synthetic rubbers include neoprene (polychloroprene), polybutadiene (including cis-1,4-polybutadiene), polyisoprene (including cis-1,4 polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, and ethylene/propylene/dicyclopentadiene terpolymers. Additional examples of rubbers which may be used include functionalized solution polymerized polymers (SBR, PBR, IBR and SIBR), silicon-coupled and tin-coupled star-branched polymers.

For the functionalized elastomers, representatives of amine functionalized SBR elastomers are, for example, in-chain functionalized SBR elastomers mentioned in U.S. Pat. No. 6,936,669, the disclosure of which is incorporated herein in its entirety.

Representative of a combination of amino-siloxy functionalized SBR elastomers with one or more amino-siloxy groups connected to the elastomer is, for example, HPR355™ from JSR and amino-siloxy functionalized SBR elastomers mentioned in U.S. Pat. No. 7,981,966, the disclosure of which is incorporated herein in its entirety.

Representative styrene/butadiene elastomers end functionalized with a silane-sulfide group are, for example, mentioned in U.S. Pat. Nos. 8,217,103 and 8,569,409, the disclosures of which are incorporated herein in their entirety.

Emulsion polymerization prepared styrene/butadiene/acrylonitrile copolymer rubbers containing about 2 to about 40 weight percent bound acrylonitrile in the copolymer are also contemplated as diene-based rubbers for use in this invention.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Oil:

The rubber composition may optionally include rubber processing oil. The rubber composition can include from 0 to about 60 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. In one embodiment, the rubber composition includes a low PCA oil. Suitable low PCA oils include but are not limited to mild extraction solvates (MES), treated distillate aromatic extracts (TDAE), residual aromatic extract (RAE), SRAE, and heavy napthenic oils as are known in the art; see, for example, U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917, the disclosures of which are hereby incorporated by reference.

Suitable low PCA oils include those having a polycyclic aromatic content of less than 3 percent by weight as determined by the IP346 method. Procedures for the IP346 method may be found in *Standard Methods for Analysis & Testing of Petroleum and Related Products and British Standard* 2000 Parts, 2003, 62nd edition, published by the Institute of Petroleum, United Kingdom.

Suitable TDAE oils are available as Tudalen® SX500 from Klaus Dahleke K G, VivaTec® 400 and VivaTec® 500 from H&R Group, and Enerthene® 1849 from BP, and Extensoil® 1996 from Repsol. The oils may be available as the oil alone or along with an elastomer in the form of an extended elastomer.

Suitable vegetable oils include, for example, soybean oil, sunflower oil, rapeseed oil, and canola oil which are in the form of esters containing a certain degree of unsaturation.

Resin:

The rubber composition may optionally include up to about 40 phr resin. A suitable measurement of Tg for resins is DSC according to ASTM D6604 or equivalent. Resin softening point is determined by ASTM E28, which might sometimes be referred to as a ring and ball softening point. In one embodiment, the rubber composition may optionally include a resin having a glass transition temperature (Tg) above 20° C. Such optional hydrocarbon resin may have a softening point above 30° C.

The resin may be selected from the group consisting of any hydrocarbon chemistry type resin (AMS, coumarone-indene, C5, C9, C5/C9, DCPD, DCPD/C9, others) & any modification thereof (phenol, C9, hydrogenation, recycled monomers, others) and any renewable biobased chemistry type resin (like any polyterpene, gum rosin, tall oil rosin, etc) & modification (phenol, C9, hydrogenation, DCPD, esters, others) and mixture thereof.

In one embodiment, the resin may be a coumarone-indene resin containing coumarone and indene as the monomer components making up the resin skeleton (main chain). Monomer ingredients other than coumarone and indene which may be incorporated into the skeleton are, for example, methyl coumarone, styrene, alphamethylstyrene, methylindene, vinyltoluene, dicyclopentadiene, cycopentadiene, and diolefins such as isoprene and piperlyene. Suitable coumarone-indenc resin is available commercially as Novares® C30 from Rutgers Novares GmbH.

Suitable petroleum resins include both aromatic and non-aromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include any C5 species (olefins and diolefins containing an average of five carbon atoms) such as cyclopentadiene, dicyclopentadiene, diolefins such as isoprene and piperylene, and any C9 species (olefins and diolefins containing an average of 9 carbon atoms) such as vinyltoluene, alphamethylstyrene and indene. Such resins are made by any mixture formed from C5 and C9 species mentioned above.

The styrene/alphamethylstyrene resin is considered herein to be a relatively short chain copolymer of styrene and alphamethylstyrene. The styrene/alphamethylstyrene resin may have, for example, a styrene content in a range of from about 10 to about 90 percent. In one aspect, such a resin can be suitably prepared, for example, by cationic copolymerization of styrene and alphamethylstyrene in a hydrocarbon solvent. Thus, the contemplated styrene/alphamethylstyrene resin can be characterized, for example, by its chemical structure, namely, its styrene and alphamethylstyrene contents and by its glass transition temperature, molecular weight and molecular weight distribution. Suitable styrene/alphamethylstyrene resin is available commercially as PURE 20 AS from Rutgers Novares GmbH.

Terpene-phenol resins may be used. Terpene-phenol resins may be derived by copolymerization of phenolic monomers with terpenes such as limonenes, pinenes and delta-3-carene.

In one embodiment, the resin is a resin derived from rosin and derivatives. Representative thereof are, for example, gum rosin, wood rosin and tall oil rosin. Gum rosin, wood rosin and tall oil rosin have similar compositions, although the number of components of the rosins may vary. Such resins may be dimerized, polymerized or disproportionated. Such resins may be in the form of esters of rosin acids and polyols such as pentaerythritol or glycol.

In one embodiment, said resin may be partially or fully hydrogenated.

Reinforcing Filler:

Another aspect of the present disclosure is the filler system. In practice, the rubber composition comprises pre-hydrophobated precipitated silica aggregates. It is recognized that precipitated silica aggregates are typically hydrophilic (water attracting) in nature and, in order to aid in dispersing the silica aggregates in various rubber compositions, it is desired to make the aggregates more hydrophobic (water repelling) in nature and therefore more compatible with rubber.

In the preferred embodiment, the silica is a particulate pre-hydrophobated precipitated silica aggregate that is added to, or mixed with, the rubber composition in a prehydrophobated form instead of hydrophobating the silica aggregates in situ within the elastomer host. U.S. Pat. No. 6,573,324 to Goodyear, the contents of which are incorporated herein, describes examples of prehydrophobated silica aggregates, which may also be prepared, for example, by treatment of colloidal silica with a combination of both an organomercaptosilane and an alkylsilane. The '324 patent explains that the hydrophobated precipitated silica may be recovered, for example, as a treated silica hydrosol, with the aid of acid addition to the treated colloidal silica followed by water washing and drying the recovered hydrophobated silica as a hydrophobated silica gel or as a hydrophobated precipitated silica.

The prehydrophobated silica of the present disclosure is not limited to any specific preparation technique. U.S. Pat. No. 4,474,908 to PPG Industries describes an example silica, which is hydrophobated in situ within the elastomer host by addition of both an organomercaptosilane and an alkyl silane.

When the reinforcing filler comprises the prehydrophobated precipitated silica aggregates, an addition of a coupling agent to the rubber composition for in-situ interaction is not considered as being necessary for the hydrophobated silica to effectively reinforce the rubber composition because the prehydrophobated precipitated silica aggregates contain an integral coupling agent namely, the sulfur containing silane coupling agent.

Commercially available prehydrophobated silicas may be used, such as, only for example herein, and without limitation, silica product from PPG Industries available under the Agilon® 400 trademark. In some embodiments, the prehydrophobated silica does not contain a sulfur containing group.

In another embodiment, the disclosed rubber composition may alternately or additionally include at least one of carbon black and precipitated silica (distinguishable from the pre-hydrophobated silica, supra) or both.

Representative examples of rubber reinforcing carbon blacks are, for example, and not intended to be limiting, those with ASTM designations of N110, N120, N121, N220, N231, N234, N242, N293, N299, 5315, N326, N330, N332, N339, N343, N347, N351, N358, N375, N539, N550, N582, N630, N642, N650, N683, N754, N762, N765, N774, N787, N907, N908, N990 and N991. Such rubber reinforcing carbon blacks may have iodine absorptions ranging from, for example, 9 to 145 g/kg and DBP numbers ranging from 34 to 150 cc/100 g.

Representative examples of precipitated silicas, which are well known, are synthetic, amorphous silicas containing hydroxyl groups on their surfaces, which may, for example, be characterized by having a BET surface area, as measured using nitrogen gas, in the range of, for example, about 40 to about 600, and more usually in a range of about 50 to about 300 square meters per gram. The BET method of measuring surface area might be described, for example, in the Journal of the American Chemical Society, Volume 60, as well as ASTM D3037.

Such precipitated silicas may, for example, also be characterized by having a dibutylphthalate (DBP) absorption value, for example, in a range of about 100 to about 400, and more usually about 150 to about 300 cc/100 g.

The conventional precipitated silica might be expected to have an average ultimate particle size, for example, in the range of 0.01 to 0.05 micron as determined by the electron microscope, although the silica particles may be even smaller, or possibly larger, in size.

Various commercially available precipitated silicas may be used, such as, only for example herein, and without limitation, silicas from PPG Industries under the Hi-Sil trademark with designations HPD320 or EZ160G, etc; and silicas from Evonik under the ULSTRASIL trademark with designations 6100GR.

Other fillers may be used in the vulcanizable rubber composition including, but not limited to, at least one additional particulate filler comprised of ultra high molecular weight polyethylene (UHMWPE); particulate polymer gels such as those disclosed in U.S. Pat. Nos. 6,242,534; 6,207,757; 6,133,364; 6,372,857; 5,395,891; or 6,127,488, and plasticized starch composite filler such as that disclosed in U.S. Pat. No. 5,672,639.

For embodiments in which the synthetic, amorphous silica is employed, the rubber composition may optionally comprise a coupling agent for the silica. It may be desired for the precipitated silica-containing rubber composition to contain a silica coupling agent comprising, for example, (A) bis(3-trialkoxysilylalkyl) polysulfide containing an average in range of from about 2 to about 4 sulfur atoms in its connecting bridge, or (B) an organoalkoxymercaptosilane, or (C) combination of said bis(3-trialkoxysilylalkyl) polysulfide and organoalkoxymercaptosilane.

Representative of such bis(3-trialkoxysilylalkyl) polysulfide is comprised of bis(3-triethoxysilylpropyl) tetrasulfide or a bis(3-trialkoxysilylalkyl) disulfide. A coupling agent is also contemplated in one embodiment comprising a mixture of bis(3-triethoxysilylpropyl) tetrasulfide (50%) and carbon black (50%).

By incorporating the high diene content EDPM, a high filler content is not required in the composition. Accordingly, in practice, the filler reinforcement comprises a total from about 5 phr to about 100 phr and, more preferably, from about 50 phr to about 75 phr and, most preferably, from about 60 to 70 phr of filler excluding coupling agent. For embodiments containing a coupling agent, the composition comprises from about 1 to about 15 phr and, more preferably from about 5 phr to about 7.5 phr coupling agent.

For embodiments comprising both carbon black and silica (prehydrophobated and/or synthetic amorphous), the contemplated embodiment comprises a majority portion silica and a minority portion carbon black. Such embodiments may comprise from about 60 to about 80 phr silica and from about 1 phr to about 20 phr carbon black. In a preferred embodiment, the reinforcement filler level does not exceed about 80 phr.

One aspect of the present disclosure is a polymer that allows for improvements to be made toward stiffness without necessitating an increase in filler content. By allowing for a reduced or maintained filler level, the disclosed composition does not demand the inherent trade-off between stiffness and hysteresis, as previously accepted for conventional compounds.

Another aspect of the present disclosure is improved processability. By employing a polymer having reduced unsaturation, the disclosed rubber compositions allow for thermomechanical mixing to be performed on the mixture for longer duration and higher temperatures than compositions that use reactive coupling agents. Therefore, the disclosed composition requires no tradeoff in processing.

It is readily understood by those having skill in the art that the vulcanizable rubber composition would be compounded by methods generally known in the rubber compounding art, and contain commonly used additive materials such as, for example, sulfur and sulfur donor curatives, sulfur vulcanization curing aids, such as activators and retarders, processing oil, fatty acid, zinc oxide, waxes, antidegradants (antioxidants and antiozonants) and peptizing agents. As known to those skilled in the art, depending on the intended use of the sulfur vulcanizable and sulfur-vulcanized material (rubbers), the additives mentioned above are selected and commonly used in conventional amounts. In the contemplated embodiment, the combined total amount of processing aids is less than 30 phr.

Representative examples of sulfur donors include elemental sulfur (free sulfur), an amine disulfide, polymeric polysulfide and sulfur olefin adducts. Usually, it is desired that the sulfur-vulcanizing agent is elemental sulfur. The sulfur-vulcanizing agent may be used in an amount ranging, for example, from about 0.5 to 10 phr, with a range of from 1.5 to 6 phr being often preferred. Typical amounts of fatty acids, if used, which can include stearic acid among other examples, comprise about 0.5 to about 3 phr. Typical amounts of zinc oxide may comprise, for example, about 2 to about 5 phr. Typical amounts of waxes comprise about 1 to about 5 phr. Often microcrystalline waxes are used. Typical amounts of peptizers, when used, may be used in amounts of, for example, about 0.1 to about 1 phr. Typical peptizers may be, for example, pentachlorothiophenol and dibenzamidodiphenyl disulfide.

Sulfur vulcanization accelerators are used to control the time and/or temperature required for vulcanization and to improve the properties of the vulcanizate. In one embodiment, a single accelerator system may be used, i.e., primary accelerator. The primary accelerator(s) may be used in total amounts ranging, for example, from about 0.5 to about 8, sometimes desirably about 0.8 to about 4, phr. In another embodiment, combinations of a primary and a secondary accelerator might be used with the secondary accelerator being used in smaller amounts, such as, for example, from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Often desirably the primary accelerator is a sulfonamide, such as, a nonlimiting example, N-cyclohexyl-2-benzothiazole sulfonamide (CBS). If a second accelerator is used, the secondary accelerator is often desirably a guanidine such as for example a diphenylguanidine (DPG), a dithiocarbamate or a thiuram compound.

Other known curatives may be used in conventional amounts.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 80° C. and 190° C. The appropriate duration of the thermomechanical working varies as a function of the operating conditions, and the volume and nature of the components. For example, the thermomechanical working may be from 1 to 20 minutes.

Vulcanization of the pneumatic tire of the present disclosure is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air.

As disclosed supra, the rubber composition may be incorporated in a tire component in a pneumatic tire or non-pneumatic tire. In one embodiment, the tire component is not ground contacting. In one embodiment, the tire component is ground contacting. In the exemplary embodiments, the tire component is a tread cap; a sidewall layer; or a base layer arranged radially below the tread cap. The tire can be built, shaped, molded and cured by various methods which will be readily apparent to those having skill in such art.

A tire of the present disclosure may be a commercial tire, race tire, passenger tire, aircraft tire, agricultural, earthmover, off-the-road (OTR), truck tire, and the like. The tire may also be a radial or bias, with a radial being preferred.

Other engineered products in which the disclosed rubber composition may be incorporated also include, as nonlimiting examples only, hoses, hose covers, window gaskets, weatherstrips, seals, roofing and insulation related products (such as shingles).

The disclosure may be better understood by reference to the following examples in which the parts and percentages are by weight unless otherwise indicated.

Example I

In Example I, the effect of the use of a higher diene content EPDM is evaluated in in formulations with various filler materials. Rubber compositions were mixed in a multi-step mixing procedure following the recipes in Table 1.

Control rubber compositions were prepared as Samples A, C and E using conventional SBR/BR polymer blend in formulations with different fillers but standard amounts of curatives. Experimental Samples B, D and F replaced the polymer blend with a high diene content EPDM. The Controls and Samples were selected to have similar glass transition (Tg) values.

Control Sample A and Experimental Sample B were both prepared using equal amounts of precipitated silica, coupling agent and carbon black, with all other ingredients being the same. Control Sample C and Experimental Sample D were both prepared using carbon black reinforcement and excluding silica. Samples C and D also omit the accelerator DPG, with all other ingredients being the same. Control Sample E and Experimental Sample F replace the silica reinforcement of Samples A and B with an equal amount of prehydrophobated silica reinforcement contained in situ within the rubber composition. Samples E and F further omit a coupling agent, with all other ingredients being the same.

For testing, the RPA was run after curing of the samples at 60° C. and 1 Hz. The rebound resilience samples were cured for 14 minutes at 160° C.

The basic formulations are illustrated in the following Table 1, which is presented in terms of parts per 100 parts by weight of rubber (phr).

TABLE 1

| | Samples | | | | | |
|---|---|---|---|---|---|---|
| | Control A | Exp'l B | Control C | Exp'l D | Control E | Exp'l F |
| Non-Productive Stage | | | | | | |
| EPDM[1] | 0 | 100 | 0 | 100 | 0 | 100 |
| SSBR[2] | 70 | 0 | 70 | 0 | 70 | 0 |
| BR[3] | 30 | 0 | 30 | 0 | 30 | 0 |
| Coupling agent[4] | 6.5 | 6.5 | 0 | 0 | 0 | 0 |
| Silica A[5] | 65 | 65 | 0 | 0 | 0 | 0 |
| Silica B[6] | 0 | 0 | 0 | 0 | 65 | 65 |
| Processing Oil | 20 | 20 | 20 | 20 | 20 | 20 |
| Carbon black | 5 | 5 | 60 | 60 | 5 | 5 |
| Wax | 1.5 | 1.5 | 1.5 | 1.5 | 1.5 | 1.5 |
| Stearic Acid | 3 | 3 | 3 | 3 | 3 | 3 |
| Antidegradant | 2 | 2 | 2 | 2 | 2 | 2 |
| Zinc Oxide | 2 | 2 | 2 | 2 | 2 | 2 |
| Productive Stage | | | | | | |
| Antidegradant | 0.75 | 0.75 | 0.75 | 0.75 | 0.75 | 0.75 |
| Sulfur | 1.5 | 1.5 | 1.5 | 1.5 | 1.5 | 1.5 |
| Accelerator[7] | 1.5 | 1.5 | 1.5 | 1.5 | 1.5 | 1.5 |
| Accelerator[8] | 2 | 2 | 0 | 0 | 2 | 2 |

[1]Ethylene-propylene-diene copolymer obtained as Vistalon™ 8600 from ExxonMobil Corporation
[2]Solution polymerized styrene butadiene rubber, 16% styrene, Sn, obtained as SLF16S42 from Goodyear
[3]Polybutadiene, Ni-catalyzed, obtained as BUD1207 from Goodyear
[4]Bifunctional organo-silane
[5]Precipitated silica obtained as ZEOSIL ® 1165 from Solvay
[6]Prehydrophobated silica obtained as Agilon ®400 from PPG
[7]N-cyclohexyl-2-benzothiazole sulfenamide (CBS)
[8]Diphenyl guanidine (DPG)

Rubber compounds were then cured and tested for predicted performance for, inter alia, stiffness and rolling resistance, with the results given in Table 2.

TABLE 2

| | Ctl A SBR/BR + precipitated silica | Exp'l B EPDM + precipitated silica | Ctl C SBR/BR + CB | Exp'l D EPDM + CB | Ctl E SBR/BR + prehydrophobated silica | Exp'l F EPDM + prehydrophobated silica |
|---|---|---|---|---|---|---|
| Stiffness (higher is better) | | | | | | |
| RPA G' 1% strain, 60° | 3249.7 | 4571.9 | 2099.2 | 2879.5 | 1431.3 | 2951.1 |
| RPA G' 5%, 60° | 2485.1 | 3473.4 | 1549.5 | 2173.6 | 1243.6 | 2406.3 |
| RPA G' 10%, 60° | 2099.9 | 2942.6 | 1361.4 | 1909.2 | 1164.8 | 2151.5 |
| Hysteresis | | | | | | |
| Tan Delta 1% | 0.122 | 0.091 | 0.132 | 0.108 | 0.08 | 0.072 |
| Tan Delta 5% | 0.127 | 0.108 | 0.155 | 0.127 | 0.092 | 0.088 |
| Tan Delta 10% | 0.123 | 0.121 | 0.149 | 0.121 | 0.089 | 0.085 |
| Rebound | | | | | | |
| Resilience | | | | | | |
| 0° C. (%) | 19.5 | 18.4 | 22.4 | 20.3 | 25.1 | 19.2 |
| Room temperature (%) | 46.7 | 47.8 | 47.6 | 52.3 | 58.5 | 54.4 |
| 100° C. (%) | 66.3 | 68.7 | 66.5 | 72.0 | 73.8 | 75.7 |

The G' modulus is a measure of stiffness. Generally, the higher the value, the stiffer the cured composition is. It can be seen from Table 2 that inclusion of the high diene content EPDM is observed to significantly increase stiffness (G') in the cured experimental rubber compositions at the probed strain levels. A predictive, beneficially increased stiffness of a tread rubber composition is evidenced, for example, by an increased storage modulus (G') property of the cured rubber composition at the probed strain levels Each of Experimental Samples B, D, and F have substantially higher G' values as compared to their respective Controls A, C, and E. Indeed, Experimental Sample F doubles the G' stiffness value of Control Sample E. Experimental Sample B maintains and improves on the stiffness of conventional compound Control A. In tire tread rubber compositions, this increased stiffness property is often desired to promote better tire handling characteristics.

Tan Delta and Rebound Resilience is a measure of hysteresis of the compound when subject to loading. Generally, the higher the measured rebound at 100° C. or the lower the tan delta value (at temperatures close to the operating temperature range of a rolling tire such as 60° C.), the lower the rolling resistance. It can further be seen in Table 2 that Experimental Samples B, D, and F (each containing high diene content EPDM) demonstrate a beneficially lower hysteresis as evidenced by each having both a lower tan delta value and a higher rebound at 100° C. This is indicative of a beneficial reduction in rolling resistance for a vehicle tire having a tread of such rubber composition, and a beneficial reduction in fuel consumption associated with the vehicle.

It can further be seen in Table 2 that Experimental Sample F (containing prehydrophobated silica) displays the lowest rolling resistance, which is substantially improved over all working samples in the example.

It is therefore concluded that the simultaneous addition of a high diene content EPDM and a prehydrophobated silica in the productive stage improves predicted stiffness without demanding a tradeoff of rolling resistance (for treads), as evidenced by the increased modulus and lower hysteresis.

Example II

In Example II, the effect of the use of a higher diene content EPDM is evaluated as a replacement of butadiene rubber in SBR/BR polymer blends used in formulations with prehydrophobated silica. The EPDM levels are contained in minor portion relative to the styrene-butadiene copolymer.

Rubber compositions were mixed in a multi-step mixing procedure following the recipes in Table 3. A control rubber composition was prepared as Sample G using a conventional SBR/BR polymer blend in formulations with prehydrophobated silica. Experimental Sample H replaced the polybutadiene rubber BR in the polymer blend with a similar amount of high diene content EPDM. Experimental Sample I was prepared as Sample H but increased the zinc oxide content with all other ingredients being the same.

The Controls and Samples were selected to have similar glass transition (Tg) values. For testing, the RPA was run at 60° C. and 1 Hz. The rebounds were cured for 14 minutes at 160° C.

The basic formulations are illustrated in the following Table 3, which is presented in terms of parts per 100 parts by weight of rubber (phr).

TABLE 3

| | Control | Experimental | |
|---|---|---|---|
| | G | H | I |
| Non-Productive Stage | | | |
| EPDM[1] | — | 40 | 40 |
| SSBR[2] | 75 | 60 | 60 |
| BR[3] | 25 | — | — |
| Processing oil | 20 | 20 | 20 |
| Prehydrophobated Silica | 73 | 73 | 73 |
| Carbon black | 3 | 3 | 3 |
| Wax | 1.5 | 1.5 | 1.5 |
| Paraffin wax | .5 | .5 | .5 |
| Stearic Acid | 3.0 | 3.0 | 3.0 |
| Antidegradant | 2.0 | 2.0 | 2.0 |
| Zinc Oxide | 1.5 | 1.5 | 4 |
| Productive Stage | | | |
| Antidegradant | .75 | .75 | .75 |
| Sulfur | 1.4 | 1.4 | 1.4 |

TABLE 3-continued

|  | Samples | | |
|---|---|---|---|
|  | Control | Experimental | |
|  | G | H | I |
| Accelerator[4] | 1.4 | 1.4 | 1.4 |
| Accelerator[5] | .5 | .5 | .5 |

[1]Ethylene-propylene-diene copolymer obtained as Vistalon™ 7602 from ExxonMobil Corporation
[2]Functionalized solution polymerized styrene butadiene copolymer rubber, 21% styrene, from Trinseo as SLR 4602
[3]Polybutadiene, Ni-catalyzed, obtained as BUD1207 from Goodyear
[4]N-cyclohexyl-2-benzothiazole sulfenamide (CBS)
[5]Diphenyl guanidine (DPG)

Rubber compounds were then cured and tested for predicted performance for, inter alia, stiffness and rolling resistance, with the results given in Table 4.

TABLE 4

|  | Samples | | |
|---|---|---|---|
|  | Control | Experimental | |
|  | G | H | I |
| Non-Productive Stage | | | |
| EPDM[1] | — | 40 | 40 |
| SSBR[2] | 75 | 60 | 60 |
| BR[3] | 25 | — | — |
| Prehydrophobated Silica | 73 | 73 | 73 |
| Zinc Oxide | 1.5 | 1.5 | 4 |
| Stiffness | | | |
| G' 1% (kPa) | 1392.5 | 2449.6 | 2139.3 |
| G' 3% (kPa) | 1301.2 | 2138.3 | 1901.9 |
| G' 5% (kPa) | 1240.9 | 1964.1 | 1765.0 |
| G' 10% (kPa) | 1144.0 | 1666.6 | 1556.5 |
| Hysteresis | | | |
| Tan Delta 1% | 0.088 | 0.105 | 0.088 |
| Tan Delta 3% | 0.096 | 0.119 | 0.099 |
| Tan Delta 5% | 0.099 | 0.126 | 0.102 |
| Tan Delta 10% | 0.100 | 0.151 | 0.104 |

The G' modulus is a measure of stiffness. A predictive, beneficially improved stiffness of a tread rubber composition is evidenced, for example, by an increased storage modulus (G') property of the cured rubber composition. Generally, the higher the (G') strain, the stiffer the cured composition is. It can be seen from Table 4 that inclusion of the high diene content EPDM is observed to substantially improve (via increase) stiffness in the cured experimental rubber Samples H and I. Each of the experimental Samples H and I have higher G' values as compared to control Sample G.

The tan delta is a measure of hysteresis of the compound. Generally, the lower the tan delta value (at temperatures representative of that of a rolling tire), the lower the rolling resistance. It can be seen from Table 4 that there is a tradeoff between stiffness and hysteresis between experimental Sample H and Control G. However, these properties are balanced in experimental Sample I (containing higher level zinc oxide), which maintains the hysteresis of Control G while improving stiffness.

Example III

In Example III, the effect of the use of a higher diene content EPDM is evaluated for use in formulations with an SBR/BR polymer blend and prehydrophobated silica. The EPDM is contained at increasing levels across the samples but comprising a minority portion of the total polymer content.

Rubber compositions were mixed in a multi-step mixing procedure following the recipes in Table 5.

Control rubber compositions were prepared as Samples J and K using a conventional f-SBR/BR polymer blend in a formulation with prehydrophobated silica, with all ingredients being the same.

Experimental Samples L-M replace increasing amounts of functionalized-SSBR and butadiene BR in Controls J and K with EPDM.

The controls and experimental samples were selected to have similar glass transition (Tg) values. For testing, the RPA was run at 60° C. and 1 Hz. The rebounds were cured for 14 minutes at 160° C.

The basic formulations are illustrated in the following Table 5, which is presented in terms of parts per 100 parts by weight of rubber (phr).

TABLE 5

|  | Samples | | | | |
|---|---|---|---|---|---|
|  | Control | | Experimental | | |
|  | J | K | L | M | N |
| Non-Productive Stage | | | | | |
| f-SSBR[1] | 75 | 75 | 65 | 60 | 55 |
| BR[2] | 25 | 25 | 15 | 10 | 5.0 |
| EPDM[3] | 0 | 0 | 20 | 30 | 40 |
| Prehydrophobated silica | 75 | 75 | 75 | 75 | 75 |
| Carbon black | 3.0 | 3.0 | 3.0 | 3.0 | 3.0 |
| Processing oil (naphthenic) | 20 | 20 | 20 | 20 | 20 |
| AMS resin | 0 | 0 | 0 | 0 | 0 |
| Waxes | 1.5 | 1.5 | 1.5 | 1.5 | 1.5 |
| Fatty acid | 3.0 | 3.0 | 3.0 | 3.0 | 3.0 |
| Antidegradant[4] | 2.0 | 2.0 | 2.0 | 2.0 | 2.0 |
| Zinc oxide | 1.5 | 5 | 5 | 5 | 5 |
| Productive Stage | | | | | |
| Antidegradant[5] | 0.75 | 0.75 | 0.75 | 0.75 | 0.75 |
| Sulfur | 1.40 | 1.40 | 1.40 | 1.40 | 1.40 |
| Accelerators | 1.90 | 1.90 | 1.90 | 1.90 | 1.90 |

[1]Functionalized solution polymerized styrene butadiene copolymer rubber, 21% styrene, from Trinseo as SLR 4602
[2]Polybutadiene, Nd-catalyzed, obtained as BUD1223 from Goodyear
[3]Ethylene-propylene-diene copolymer obtained as Vistalon™ 8600 from ExxonMobil Corporation
[4]N-(1,3 Dimethyl Butyl)-N'-Phenyl-p-PhenyleneDiamine
[5]Mixture of Aryl-p-Phenylene-Diamines Rubber compounds were then cured in the tire and tested for predicted performance for, inter alia, stiffness and rolling resistance, with the results given in Table 6.

TABLE 6

|  | Samples | | | | |
|---|---|---|---|---|---|
|  | Control | | Experimental | | |
|  | J | K | L | M | N |
| G' 0.833 Hz (kPa) | 217.8 | 225.0 | 275.5 | 300.3 | 329.0 |
| Tan Delta 0.833 Hz | 0.766 | 0.74 | 0.674 | 0.653 | 0.63 |
| Stiffness (First Strain Sweep) | | | | | |
| G' 1% (kPa) | 1413.5 | 1402.9 | 1812.4 | 2012.9 | 2275.3 |
| G' 5% (kPa) | 1252.2 | 1240.4 | 1529.5 | 1668.5 | 1845.9 |
| G' 10% (kPa) | 1156.0 | 1152.4 | 1374.9 | 1485.6 | 1617.9 |
| G' 15% (kPa) | 1082.1 | 1086.5 | 1266.5 | 1360.8 | 1466.0 |

TABLE 6-continued

| | Samples | | | | |
|---|---|---|---|---|---|
| | Control | | Experimental | | |
| | J | K | L | M | N |
| Hysteresis (First Strain Sweep) | | | | | |
| Tan Delta 1% | 0.091 | 0.083 | 0.086 | 0.087 | 0.089 |
| Tan Delta 5% | 0.099 | 0.091 | 0.099 | 0.103 | 0.105 |
| Tan Delta 10% | 0.099 | 0.092 | 0.100 | 0.104 | 0.106 |
| Tan Delta 15% | 0.102 | 0.093 | 0.101 | 0.105 | 0.108 |
| Stiffness (Second Strain Sweep) | | | | | |
| G' 1% (kPa) | 1276.3 | 1279.9 | 1565.5 | 1716.1 | 1876.9 |
| G' 5% (kPa) | 1168.4 | 1169.0 | 1387.3 | 1498.5 | 1627.3 |
| G' 10% (kPa) | 1115.1 | 1116.2 | 1303.9 | 1406.6 | 1514.4 |
| G' 15% (kPa) | 1074.0 | 1076.6 | 1247.2 | 1341.8 | 1439.5 |
| Hysteresis (Second Strain Sweep) | | | | | |
| Tan Delta 1% | 0.093 | 0.084 | 0.092 | 0.094 | 0.097 |
| Tan Delta 5% | 0.104 | 0.093 | 0.104 | 0.107 | 0.110 |
| Tan Delta 10% | 0.103 | 0.093 | 0.102 | 0.105 | 0.108 |
| Tan Delta 15% | 0.103 | 0.092 | 0.101 | 0.104 | 0.107 |
| Rebound | | | | | |
| at 0° C. | 9.5 | 9.8 | 8.2 | 7.2 | 6.8 |
| at room temp | 54.6 | 57.0 | 53.6 | 51.5 | 48.6 |
| at 60° C. | 65.0 | 65.9 | 64.1 | 64.2 | 62.6 |
| at 100° C. | 69.9 | 70.8 | 69.5 | 69.2 | 67.0 |

It can be seen from Table 6 that inclusion of the high diene content EPDM is observed to substantially improve (via increase) the stiffness in the cured experimental rubber Samples L-N. A predictive, beneficially increased stiffness of a tread rubber composition is evidenced, for example, by an increased storage modulus (G') property of the cured rubber composition. Each of the experimental Samples L, M and N have higher G' values as compared to control Samples J and K. Indeed, the G' value of Sample N increases by about 40% in the first strain sweep and over 30% in the second strain sweep.

Tan Delta and rebound are a measure of hysteresis of the compound when subject to loading. Generally, the higher the rebound at 100° C., and the lower the Tan Delta the lower the rolling resistance. It can be seen from Table 6 that experimental Samples L and M maintain the hysteresis of Controls J and K, while experimental Sample N approaches the hysteresis of J and K. The tan delta values are also consonant with this indication.

Sample M improves stiffness the most without a loss to rolling resistance. For this reason, the formula of M is treated as best in class for Example IV.

Example IV

In Example IV, the effect of the use of different types of a higher diene content EPDMs are evaluated for use in formulations with an SBR/BR polymer blend and prehydrophobated silica. Rubber compositions were mixed in a multi-step mixing procedure following the recipes in Table 7.

Control rubber compositions were prepared as Samples J and K using a conventional f-SBR/BR polymer blend in a formulation with prehydrophobated silica.

Experimental Sample O replaced the total reduction in functionalized-SSBR and butadiene BR in Controls J and K with equal parts of EPDM. Sample 0 also reduced the level of prehydrophobated silica by 5 phr, with all other ingredients being the same.

Experimental Sample P replaced the high diene content EDPM grade of Sample 0 with equal parts of a different grade having lower Mooney Viscosity and ethylene content, with all other ingredients being the same. Experimental Sample Q modified Sample P with the addition of a high Tg (>20° C.) resin.

The controls and samples were selected to have similar glass transition (Tg) values. For testing, the RPA was run at 60° C. and 1 Hz. The rebounds were cured for 14 minutes at 160° C.

The basic formulations are illustrated in the following Table 7, which is presented in terms of parts per 100 parts by weight of rubber (phr).

TABLE 7

| | Samples | | | | |
|---|---|---|---|---|---|
| | Control | | Experimental | | |
| Non-Productive Stage | J | K | O | P | Q |
| f-SSBR[1] | 75 | 75 | 60 | 60 | 60 |
| BR[2] | 25 | 25 | 10 | 10 | 10 |
| EPDM[3] | 0 | 0 | 30 | 0 | 0 |
| EPDM[4] | 0 | 0 | 0 | 30 | 30 |
| Prehydrophobated silica | 75 | 75 | 70 | 70 | 70 |
| Carbon black | 3.0 | 3.0 | 3.0 | 3.0 | 3.0 |
| Processing oil (naphthenic) | 20 | 20 | 20 | 20 | 20 |
| Resin[5] | 0 | 0 | 0 | 0 | 10 |

[1]Functionalized solution polymerized styrene butadiene copolymer rubber, 21% styrene
[2]Polybutadiene, Nd-catalyzed, obtained as BUD1223 from Goodyear
[3]Ethylene-propylene-diene copolymer obtained as Vistalon™ 8600 from ExxonMobil Corporation
[4]Ethylene-propylene-diene copolymer obtained as Vistalon™ 7602 from ExxonMobil Corporation
[5]AMS Resin, softening point 85° C.

Rubber compounds were then cured in the tire and tested for predicted performance for, inter alia, stiffness and rolling resistance, with the results given in Table 8.

TABLE 8

| | Samples | | | | |
|---|---|---|---|---|---|
| | Control | | Experimental | | |
| | J | K | O | P | Q |
| G' 0.833 Hz (kPa) | 217.8 | 225.0 | 270.7 | 278.7 | 308.4 |
| Tan Delta 0.833 Hz | 0.766 | 0.74 | 0.645 | 0.658 | 0.652 |
| Stiffness (First Strain Sweep) | | | | | |
| G' 1% (kPa) | 1413.5 | 1402.9 | 1684.1 | 1780.0 | 1861.3 |
| G' 5% (kPa) | 1252.2 | 1240.4 | 1457.5 | 1527.3 | 1579.6 |
| G' 10% (kPa) | 1156.0 | 1152.4 | 1331.3 | 1389.6 | 1432.5 |
| G' 15% (kPa) | 1082.1 | 1086.5 | 1242.2 | 1294.1 | 1330.8 |
| Hysteresis (First Strain Sweep) | | | | | |
| Tan Delta 1% | 0.091 | 0.083 | 0.079 | 0.081 | 0.09 |
| Tan Delta 5% | 0.099 | 0.091 | 0.092 | 0.093 | 0.102 |
| Tan Delta 10% | 0.099 | 0.092 | 0.092 | 0.094 | 0.104 |
| Tan Delta 15% | 0.102 | 0.093 | 0.092 | 0.096 | 0.104 |
| Stiffness (Second Strain Sweep) | | | | | |
| G' 1% (kPa) | 1276.3 | 1279.9 | 1490.1 | 1560.7 | 1629.8 |
| G' 5% (kPa) | 1168.4 | 1169.0 | 1345.5 | 1402.8 | 1450.7 |
| G' 10% (kPa) | 1115.1 | 1116.2 | 1275.7 | 1328.9 | 1368.4 |
| G' 15% (kPa) | 1074.0 | 1076.6 | 1225.8 | 1274.1 | 1312.5 |

TABLE 8-continued

| | Samples | | | | |
|---|---|---|---|---|---|
| | Control | | Experimental | | |
| | J | K | O | P | Q |
| Hysteresis (Second Strain Sweep) | | | | | |
| Tan Delta 1% | 0.093 | 0.084 | 0.083 | 0.088 | 0.095 |
| Tan Delta 5% | 0.104 | 0.093 | 0.094 | 0.098 | 0.107 |
| Tan Delta 10% | 0.103 | 0.093 | 0.093 | 0.097 | 0.105 |
| Tan Delta 15% | 0.103 | 0.092 | 0.092 | 0.097 | 0.104 |
| Rebound | | | | | |
| at 0° C. | 9.5 | 9.8 | 7.5 | 7.4 | 8.9 |
| at room temp | 54.6 | 57.0 | 52.7 | 52.7 | 42.2 |
| at 60° C. | 65.0 | 65.9 | 65.2 | 65.6 | 63.4 |
| at 100° C. | 69.9 | 70.8 | 70.5 | 71.1 | 69.0 |

It can be seen from Table 8 that inclusion of the high diene content EPDM substantially improves (via increase) stiffness in the cured experimental rubber Samples O-Q. A predictive, beneficially increased stiffness of a tread rubber composition is evidenced, for example, by an increased storage modulus (G') property of the cured rubber composition. Each of the experimental Samples O, P and Q have higher G' values as compared to control Samples J and K.

It can further be seen in Table 8 that the addition of a resin further improves stiffness.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A rubber composition for incorporation in an engineered article, the composition comprising, based on 100 parts by weight (phr) elastomer:
    100 phr of elastomer comprising at least ethylene-propylene-diene copolymer (EPDM), the EPDM having a diene content being greater than 5%, the elastomer excluding a conjugated diene-based rubber;
    from about 5 phr to about 100 phr reinforcing filler comprising:
        (a) pre-hydrophobated precipitated silica, and
        (b) optionally an additional reinforcing filler selected from at least one of carbon black and silica;
            optionally a coupling agent for the additional silica.

2. The rubber composition of claim 1 further comprising up to 40 phr of a hydrocarbon resin having a Tg greater than 20° C.

3. The rubber composition of claim 1, wherein the article is a hose, hose cover, window gasket, weatherstrip, seal, belt, shoe sole, or shingle.

4. The rubber composition of claim 3, wherein the article is a tire component.

5. The rubber composition of claim 4, wherein the tire component is a tread cap; a sidewall layer; or a base layer arranged radially below the tread cap.

6. The rubber composition of claim 1, wherein the EPDM is characterized by a Mooney Viscosity greater than 80 MU.

7. The rubber composition of claim 1, wherein the EPDM is characterized by an ethylene content less than sixty percent (60%).

8. The rubber composition of claim 1 further comprising greater from 1 to about 20 phr carbon black.

9. The rubber composition of claim 1 further comprising silica and coupling agent.

10. A rubber composition for incorporation in an engineered article, the composition comprising, based on 100 parts by weight (phr) elastomer:
    from 50 to about 100 phr of elastomer comprising at least ethylene-propylene-diene copolymer (EPDM), the EPDM having a diene content being greater than 5% and containing branching, a Mooney Viscosity greater than 80 MU and less than 150 MU, and an ethylene content less than 60%;
    from 0 to about 50 phr of at least one conjugated diene-based elastomer;
    from about 5 phr to about 100 phr reinforcing filler comprising at least a prehydrophobated silica;
    optionally the EPDM being capable of reacting with one of itself and a reinforcing filler; and optionally the prehydrophobated silica does not contain a sulfur containing group.

11. The rubber composition of claim 10, wherein the filler comprises
    (a) from about 50 to about 95 phr precipitated silica, and
    (b) optionally an additional reinforcing filler selected from at least one of carbon black and silica;
        the composition further optionally comprising a coupling agent for the additional silica.

12. The rubber composition of claim 11, wherein the precipitated silica is a prehydrophobated silica.

13. The rubber composition of claim 10, wherein the filler comprises carbon black and excludes silica.

14. The rubber composition of claim 10, wherein the article is a hose, hose cover, window gasket, weatherstrip, seal, belt, shoe sole, shingle or a tire component.

15. The rubber composition of claim 14, wherein the tire component is a tread cap; a sidewall layer; or a base layer arranged radially below the tread cap.

16. A rubber composition for incorporation in an engineered article, the composition comprising, based on 100 parts by weight (phr) elastomer:
    from 20 to about 50 phr of elastomer comprising at least ethylene-propylene-diene copolymer (EPDM), the EPDM having a diene content being greater than 5% and containing branching, a Mooney Viscosity greater than 80 MU, and an ethylene content less than 60%;
    from 50 to about 80 phr of at least one conjugated diene-based elastomer;
    from about 5 phr to about 100 phr prehydrophobated silica; and
    optionally up to 40 phr of a high Tg resin.

17. The rubber composition of claim 10, wherein the article is a tire component.

18. The rubber composition of claim 16, wherein the article is a tire component.

* * * * *